(12) United States Patent
Their et al.

(10) Patent No.: US 7,130,822 B1
(45) Date of Patent: Oct. 31, 2006

(54) BUDGET PLANNING

(75) Inventors: Adam Their, Burnsville, MN (US); Jon Sandles, York (GB); Duncan Pearson, York (GB)

(73) Assignee: Cognos Incorporated, Ottawa (CA)

( * ) Notice: Subject to any disclaimer, the term of this patent is extended or adjusted under 35 U.S.C. 154(b) by 571 days.

(21) Appl. No.: 09/628,479

(22) Filed: Jul. 31, 2000

(51) Int. Cl.
G06F 17/60 (2006.01)

(52) U.S. Cl. ............... 705/35; 705/1; 705/7; 705/10
(58) Field of Classification Search ............ 705/30, 705/31, 32, 7, 8, 10, 1, 35
See application file for complete search history.

(56) References Cited

U.S. PATENT DOCUMENTS

| | | |
|---|---|---|
| 5,172,313 A | 12/1992 | Schumacher |
| 5,381,332 A | 1/1995 | Wood |
| 5,406,477 A | 4/1995 | Harhen |
| 5,461,699 A | 10/1995 | Arbabi et al. |
| 5,524,253 A | 6/1996 | Pham et al. |
| 5,774,868 A | 6/1998 | Cragun et al. |
| 5,799,286 A * | 8/1998 | Morgan et al. ............ 705/30 |
| 5,974,395 A | 10/1999 | Bellini et al. |
| 6,023,702 A | 2/2000 | Leisten et al. |
| 6,067,525 A | 5/2000 | Johnson et al. |
| 6,073,108 A * | 6/2000 | Peterson ............ 705/30 |
| 6,151,601 A | 11/2000 | Papierniak et al. |
| 6,161,051 A | 12/2000 | Hafemann et al. |
| 6,161,103 A | 12/2000 | Rauer et al. |
| 6,169,534 B1 | 1/2001 | Raffel et al. |
| 6,173,310 B1 | 1/2001 | Yost et al. |
| 6,182,060 B1 | 1/2001 | Hedgcock et al. |
| 6,385,301 B1 | 5/2002 | Nolting et al. |
| 6,385,604 B1 | 5/2002 | Bakalash et al. |
| 6,397,191 B1 | 5/2002 | Notani et al. |
| 6,411,936 B1 | 6/2002 | Sanders |
| 6,418,420 B1 * | 7/2002 | DiGiorgio et al. ............ 705/40 |
| 6,424,979 B1 | 7/2002 | Livingston et al. |
| 6,430,539 B1 | 8/2002 | Lazarus et al. |
| 6,434,544 B1 | 8/2002 | Bakalash et al. |
| 6,496,831 B1 | 12/2002 | Baulier et al. |
| 6,687,713 B1 * | 2/2004 | Mattson et al. .......... 707/104.1 |
| 2001/0027455 A1 | 10/2001 | Abulleil et al. |
| 2002/0042755 A1 | 4/2002 | Kumar et al. |

(Continued)

FOREIGN PATENT DOCUMENTS

EP    0294187 A2 *  6/1988

(Continued)

OTHER PUBLICATIONS

U.S. Appl. No. 09/575,599, entitled "Revenue Forecasting and Sales Force Management Using Statistical Analysis," filed May 22, 2000, Adam Thier.

(Continued)

*Primary Examiner*—Jagdish N Patel
(74) *Attorney, Agent, or Firm*—Shumaker & Sieffert, P.A.

(57) ABSTRACT

The invention is directed to a budget planning system that improves the accuracy and predictability of budget planning within large organizations by enabling organizations to reconcile corporate financial models and organizational targets with detailed spending forecasts. The budgeting system includes a database that is configured to store data defining a budgeting model for the organization. The model has a plurality of hierarchically arranged nodes, each node corresponding to a "contributor" that either provides forecast data or review data provided by contributors associated with lower level nodes. The system is configured to capture target data from a set of financial analysts, capture forecast data from the contributors and reconcile the target data and the forecast data according to the model.

17 Claims, 17 Drawing Sheets

U.S. PATENT DOCUMENTS

| | | |
|---|---|---|
| 2002/0049701 A1 | 4/2002 | Nabe et al. |
| 2002/0082892 A1 | 6/2002 | Raffel et al. |
| 2002/0087523 A1 | 7/2002 | Sivaraman |
| 2002/0129003 A1 | 9/2002 | Bakalash et al. |
| 2002/0143755 A1 | 10/2002 | Wynblatt et al. |
| 2002/0169658 A1 | 11/2002 | Adler |
| 2003/0018510 A1 | 1/2003 | Sanches |
| 2003/0084053 A1 | 5/2003 | Govrin et al. |
| 2003/0144894 A1 | 7/2003 | Robertson et al. |
| 2004/0045014 A1 | 3/2004 | Radhakrishnan |
| 2004/0128185 A1 | 7/2004 | Tsai |
| 2004/0143470 A1 | 7/2004 | Myrick et al. |

FOREIGN PATENT DOCUMENTS

| | | |
|---|---|---|
| WO | WO 94/18620 A1 | 8/1994 |
| WO | WO 02/11041 A1 | 2/2002 |
| WO | WO 02/192241 A1 | 3/2002 |

OTHER PUBLICATIONS

U.S. Appl. No. 10/370,183, entitled "Cascaded Planning of an Enterprise Planning Model," filed Feb. 19, 2003, Adam Thier.

U.S. Appl. No. 10/370,182, entitled "Horizontal Enterprise Planning in Accordance with an Enterprise Planning Model," filed Feb. 19, 2003, Adam Thier.

MacKay Neural Computation, 1992, 4(3): 415-447.

MacKay Neural Computation, 1992, 4(3): 448-472.

MacKay Neural Computation, 1992, 4(5): 720-735.

"Microsoft Press Computer Dictionary," 1997, Microsoft Press, Third Edition, p. 130.

U.S. Appl. No. 10/262,591 entitled "Real-Time Aggregation of Data Within an Entherprise Planning Environment," filed, Sep. 30, 2002, by Adam Thier et al.

U.S. Appl. No. 10/675,909 entitled "Node-Level Modification During Execution of an Enterprise Planning Model," filed, Sep. 30, 2003, by George Duncan Pearson et al.

U.S. Appl. No. 10/262,590 entitled "Selective Deployment of Software Extensions Within an Enterprise Modeling Environment," filed Sep. 30, 2002, by Brian S. Humenansky et al.

U.S. Appl. No. 10/262,606 entitled "Inline Compression of a Network Communication Within an Enterprise Planning Environment," filed Sep. 30, 2002, by Brian S. Humenansky et al.

U.S. Appl. No. 10/262,651 entitled "Deploying Multiple Enterprise Planning Models Across Clusters of Application Servers," filed Sep. 30, 2002, by Brian S. Humenansky et al.

Adaytum Software, www.adaytum.co.uk, Apr. 2, 1998 [retrieved Dec. 20, 2004], pp. 1-25, retrieved from Google.com and archive.org.

Simon, Gary, "Plan to Throw Away your Spreadsheet!: A product Review of Adaytum Planning", Deloitte & Touche, Apr. 1998 [retrieved Dec. 05, 2005], pp. 1-4, retrieved from: archive.org and www.adaytum.co.uk.

Teach, Edward, "Budgeting and Planning: Planning for the Masses", CFO Magazine, Mar. 2000 [retrieved Dec. 5, 2005], pp. 1-3, retrieved from: Archive.org and www.adaytum.co.uk.

Adaytum Software, www.adaytum.co.uk, Mar. 04, 2001 [retrieved Dec. 05, 2005], pp. 1-41, retrieved from: Archive.org and google.com.

"Adaytum Software Announces Industry's First Financial Planning and Modeling Solution", Business Wire, Nov. 9, 1998 [retrieved Dec. 5, 2005], pp. 1-9, retrieved from: Dialog, file 20.

"Delivering Double Decker Budgets at Pizza Hut UK", www.adaytum.co.uk, Jul. 12, 2000 [retrieved Dec. 5, 2005], pp. 1-4, retrieved from: Archive.org and adaytum.co.uk.

"Crate and Barrel Drives Expansion and Confidence and Accuracy Using Adaytum E. Planning", www.adaytum.com, Aug. 19, 2000 [retrieved Dec. 5, 2005], pp. 1-2, retrieved from: Archive.org and adaytum.com.

"Checking on Profitability", www.adaytum.co.uk, Jul. 9, 2000 [retrieved Dec. 5, 2005], pp. 1-4, retrieved from: archive.org and www.adaytum.co.uk.

"Flexible Planning at Birmingham Midshires", www.adaytum.co.uk, May 21, 2000 [retrieved Dec. 5, 2005], pp. 1-3, retrieved from: Archive.org and www.adaytum.com.uk.

* cited by examiner

BUDGET PLANNING

TECHNICAL FIELD

The invention relates to computer-implemented techniques for budgeting organizational expenses.

BACKGROUND

Businesses periodically perform detailed expense planning in order to forecast the cash requirements of the company. Expense planning, however, is a difficult and expensive task that often produces inaccurate results. Conventionally, budget planning has consisted of periodically distributing forms to management personnel and requiring each personnel to estimate upcoming expenses and allocate the expenses to a number of categories, such as advertisement, travel, and salaries.

SUMMARY

The invention is directed to a budget planning system that improves the accuracy and predictability of budget planning within large organizations by enabling organizations to reconcile corporate financial models and organizational targets with detailed spending forecasts. According to one aspect, the invention is directed to a budgeting system in which a database is configured to store data that defines budgeting model for the organization. The model has a plurality of hierarchically arranged nodes, each node corresponding to a "contributor" that either provides forecast data or review data provided by contributors associated with lower level nodes. The system is configured to capture target data from a set of financial analysts, capture forecast data from the contributors and reconcile the target data and the forecast data according to the model. More specifically, the budgeting system captures forecast data from contributors associated with nodes of a lower level of the hierarchy propagates the forecast data up the hierarchy based on reviews received at by contributors at each level. For example, the system increments the current level when a contributor accepts the forecast data and decrements the current level when the contributor rejects the forecast data.

According to another aspect, the invention is directed to a method for generating a budget. A model of an organization is developed that has a plurality of nodes hierarchically arranged into a number of levels. Each node of the hierarchy is associated with a contributor. For example, forecast data is captured from a contributor associated with a node within a lower level of the hierarchy and review information is captured from contributors associated with higher-level nodes. In this manner, updating a current level according to review information such that the forecast data is passed up the model when accepted and down the model when rejected traverses the model. Target data representing organizational targets is captured from analysts and presented to the contributors during the review process, thereby allowing for easily reconciliation of the forecast data and the target data.

According to another aspect, the invention is directed to a computer-readable medium comprising a set of data structures to store data that defines an organizational model having a plurality of nodes that are hierarchically arranged into a number of levels and a second set of data structures store data that defines a number of contributors and relates each node to a contributor.

Various embodiments of the invention are set forth in the accompanying drawings and the description below. Other features and advantages of the invention will become apparent from the description, the drawings, and the claims.

DETAILED DESCRIPTION

Conventionally, businesses have taken either a "top-down" or a "bottom-up" approach to budget planning. In "top-down" planning, businesses identify fundamental business targets, such as average product price, cost per employee, etc., and push the targets down through the hierarchical structure of the corporation. In contrast, "bottom-up" planning involves the aggregation of spending forecasts from the lowest cost centers of an organization, typically by compiling a myriad of spreadsheets. However, the bottom-up spending forecasts rarely, if ever, reconcile with top down business targets. As such, the invention is directed to a budget planning system that improves the accuracy and predictability of budget planning within large organizations by enabling organizations to reconcile corporate financial models and planning targets with detailed spending forecasts.

Figure 1:
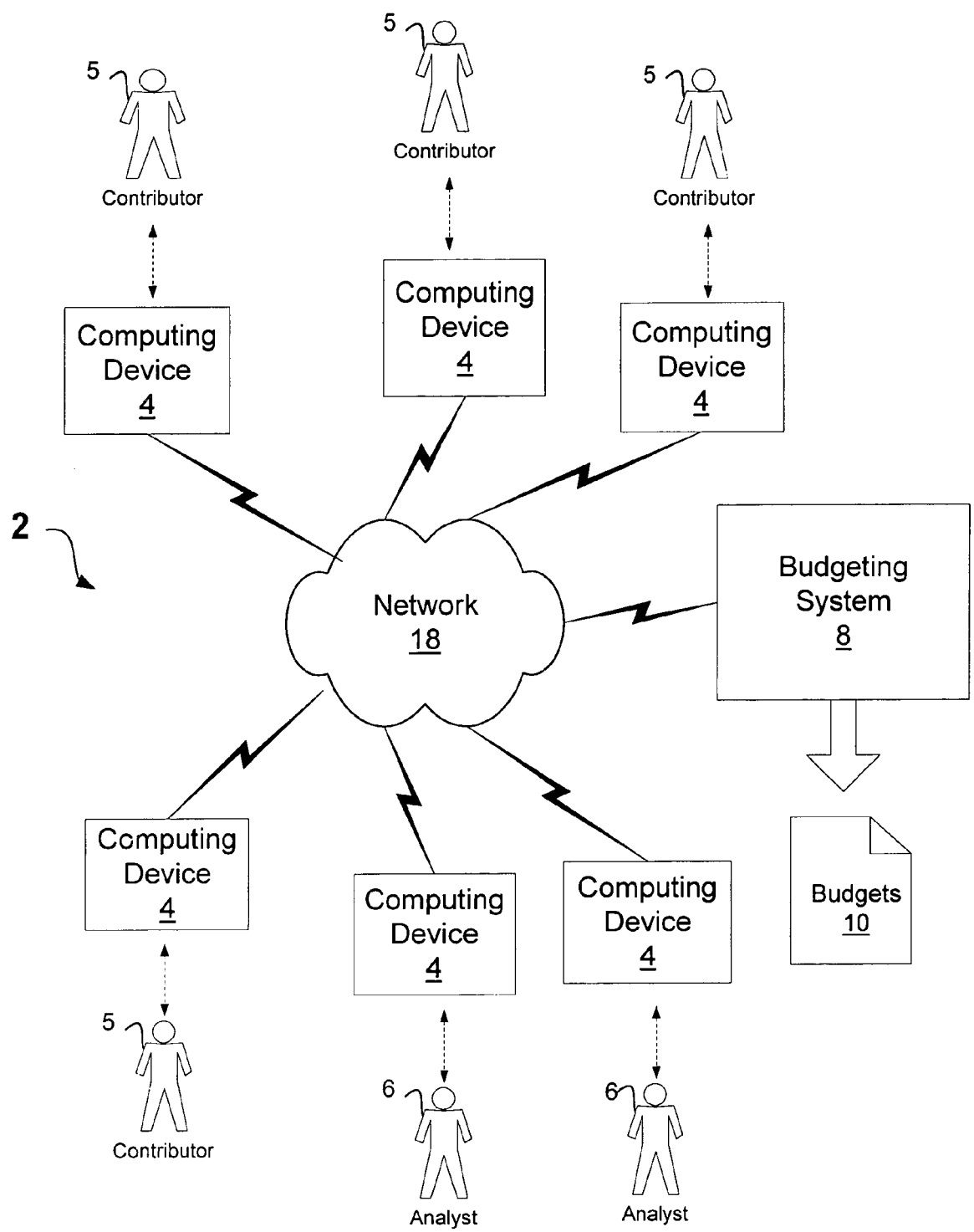
FIG. 1 is a block diagram illustrating a system that enables and automates the reconciliation of top-down corporate financial models and planning targets with detailed bottom-up budget estimates.

FIG. 1 is a block diagram illustrating a system 2 that enables and automates the reconciliation of top-down corporate financial models and planning targets with detailed bottom-up spending forecasts. System 2 includes a budgeting system 8 communicatively linked to a number of computing devices 4 by network 18 such that contributors 5 and financial analysts 6 can remotely access budgeting system 8 throughout the budgeting process.

Generally, the budgeting process can be divided into three stages: (1) a modeling stage, (2) a contribution stage and (3) a reconciliation stage. In the modeling stage, financial analysts 6, such as the chief financial officer, senior financial analysts or product and sales analysts, define analysis requirements and build financial planning models for the organization. More specifically, financial analysts 6 develop a model having a number of hierarchically arranged nodes representing various cost centers within the organization, such as business units or departments. Next, financial analysts 6 define corporate targets for each cost center. Financial analysts 6 then assign a contributor to each node, such as a manager, supervisor, sales representative, or lab manager, that is responsible for the budgets for the corresponding cost center. Finally, financial analysts 6 define a number of templates for collecting spending forecast data from the contributors. Financial analysts 6 include the corporate target data in the templates to facilitate reconciliation with the spending forecast data.

After the financial model and budget templates have been defined and the target data has been entered, budgeting system 8 enters the contribution phase during which contributors 5 interact with budgeting system 8 and enter detailed forecasts. After contributors 5 throughout the organization have entered the detailed forecast data, budgeting system 8 enters the reconciliation phase and operates according to a hierarchical budgeting and planning process having multiple reconciliation levels. At each level, the target data is reconciled with the forecast data, thereby ensuring more accurate budget planning than with conventional techniques.

Contributors 5 and analysts 6 use computing devices 4 to interact with budgeting system 8 via network 18. Computing devices 4 represent any communication device suitable for interfacing with network 18 and interacting with budgeting system 8. One example of a suitable computing device 4 is a personal computer running a web browser such as Internet Explorer™ from Microsoft Corporation of Redmond, Wash. Alternatively, computing device 4 can be a personal digital assistant (PDA) such as a Palm™ organizer from Palm Inc. of Santa Clara, Calif. In addition, communication device 16 can be a network-enabled cellular telephone. Network 18 represents any communication network, such as a packet-based digital network like the Internet. In this manner, system 2 can readily scale to suit large organizations such as global companies.

Figure 2:
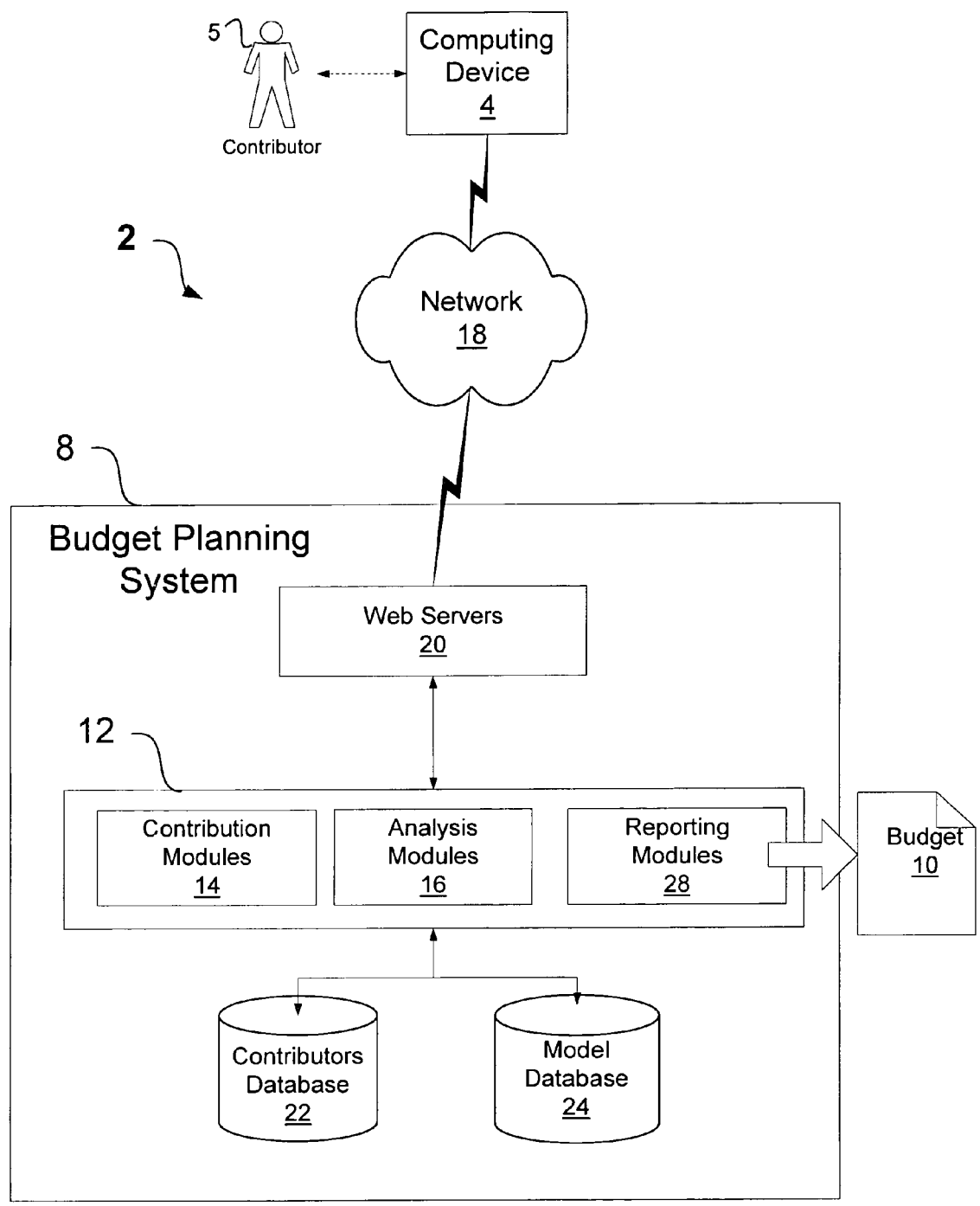
FIG. 2 in further detail one example of budget planning system.

FIG. 2 is a block diagram illustrating one example of budgeting system 8. Budgeting system 8 includes web servers 20, software modules 12, user database 22 and model database 24. Although illustrated as separate databases, contributor database 22 and model database may be implemented as a single database, such as a relational database management system (RDBMS), provided by one or more database servers.

Web servers 20 provide an interface for communicating with computing devices 4 via network 18. Web servers 20 execute web server software, such as Internet Information Server™ from Microsoft Corporation, of Redmond, Wash. As such, web servers 20 provide an environment for interacting with contributors 5 and analysts 6 according to software modules 12, which can include Lotus scripts, Java scripts, Java Applets, Active Server Pages, web pages written in hypertext markup language (HTML) or dynamic HTML, Active X objects, and other suitable modules. Web servers 20 serve up web pages defined by software modules 12 and communicate the web pages to computing devices 4. The web pages may include static media such as text and graphic imagery, as well as conventional input media such as text entry boxes, radio buttons, drop-down menus, and the like, for receiving information from contributors 5 and analysts 6.

Software modules 20 can generally be grouped into three categories including contribution modules 14, analysis modules 16 and reporting modules 28. Analysis modules 16 include software modules for defining the organization's financial models and overall budgeting process. For example, analysis modules 16 allow analysts 6 to define the various cost centers, the corresponding owners and the number of reconciliation stages in budgeting process. In one configuration, analysis modules 26 read cost-center structures and ownership from an enterprise resource planning (ERP) database (not shown). In addition, analysis modules 16 allow financial analysts 6 to define the "templates" for collecting forecast data. A template is a multi-dimensional structure that provides an interface for entering and calculating forecast data. For example, the template may define cost centers as a dimension for selecting data, with a chart of account 5 along the rows, and periods in the columns.

Analysis modules 16 also allow the organization to define a number of mechanisms for automating the budgeting process and ensuring that the contributors 5 complete budgets timely and that templates quickly move through the reconciliation stages. For example, using analysis modules 16, the financial analysts 6 can define timers for triggering electronic mail messages (emails) to remind the contributors 5 to access budgeting system 8 and complete a particular template. Contribution modules 14 include software modules for displaying the budget templates and for receiving forecast data from the contributors 5. Reporting modules 28 generate a variety of budgeting reports 10 that provide a variety of information relating to budget forecasting and organizational planning generally.

User database 22 stores information for each contributor 5 including the contributor's name, email address, and respective cost center. Model database 24 stores the models defined by the financial analysts including the data entry templates. For example, model database 24 stores information that defines the reconciliation process defined by analysts 6 including the number of reconciliation levels, the various "nodes" in the hierarchy, and the contributor 5 associated with each node.

Figure 3:
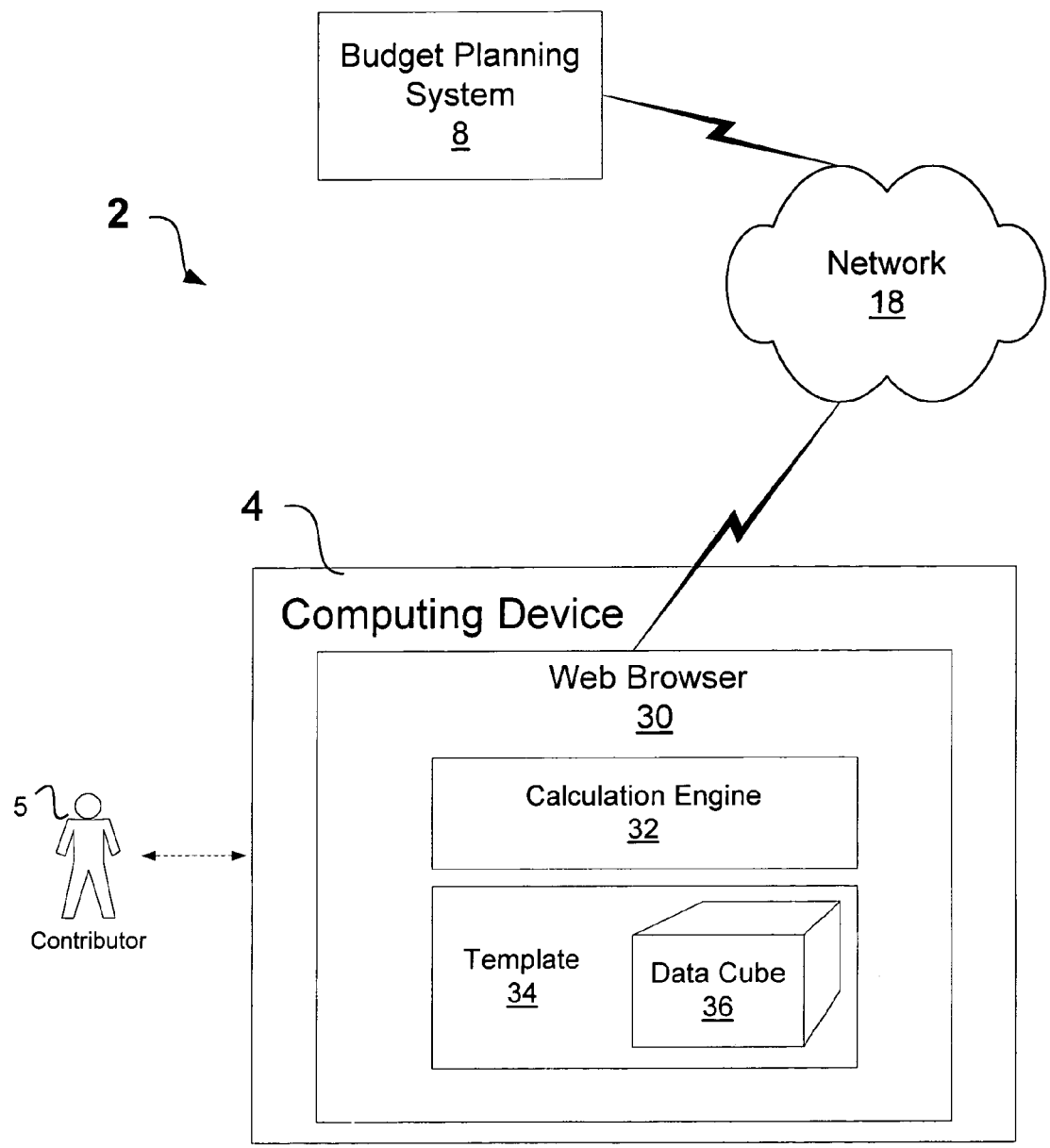
FIG. 3 is a block diagram illustrating one example of communication device, and the software modules executing thereon, used for communicating with the budget planning system of FIG. 2.

FIG. 3 is a block diagram illustrating an example computing device 4, including various software modules executing thereon, when operated by a contributor 5. Computing device 4 includes web browser 30, calculation engine 32, template 34 and data cube 36. When a contributor 5 directs computing device 4 to access budgeting system 8, calculation engine 32, and template 34 are downloaded and installed within browser 30. The calculation engine 32 is a forward calculation engine wrapped in an Active X object built in an array-based language. Template 34 is an Active X control that includes any necessary drivers for entering and manipulating budget forecast data. Template 34 comprises a standalone data cube 36 containing the target data and the budget data such that all calculations can be performed locally. Therefore, after the download is complete, the contributor 5 is able to modify the forecast data within template 34 and perform calculations without accessing budgeting system 8. As ActiveX components, calculation engine 32, template 34 and data cube 36 are maintained locally via computing device 4. As such, the contributor 5 will only experience network delays when template 34 and calculation engine 32 are initially downloaded, as well as when template 34 is saved at the end of a session.

The contributor 5 uses browser 30 to interact with template 34, such as filling in cells of a grid and viewing the dynamic changes that occur to calculated items within the grid. Because calculation engine 32 is resident within browser 30, the cell entries do not have to be resubmitted to budgeting system 8, recalculated, and then re-posted to the web browser 30 via network 18. If the contributor 5 wishes to end the budgeting session, but has not finished the process, the contributor 5 can save template 34 and data cube 36 to budgeting system 8. When the contributor 5 wishes to continue budgeting, he or she can access budgeting system 8 at which time the appropriate template 34 and data cube 36 will be loaded in browser 30 for further editing. When the contributor 5 is satisfied with the budget data entered within template 34, the contributor 5 can submit the data to budgeting system 8. Budgeting system 8 notifies the financial analysts 6 as to which contributors 5 have submitted budgets.

Figure 4:
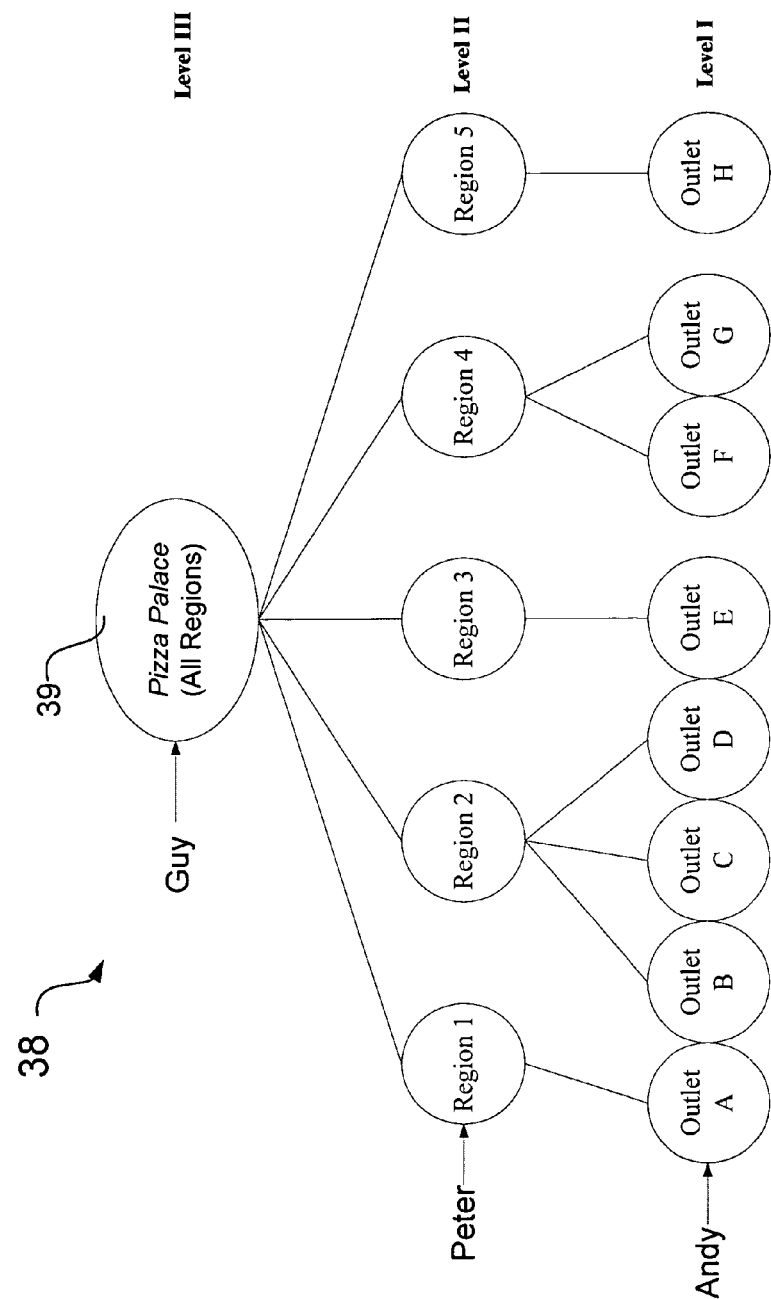
FIG. 4 graphically illustrates an exemplary hierarchical budgeting and planning model.

To further illustrate the distributed budget planning process facilitated by the invention, consider the following example involving a fictitious pizza chain: Pizza Palace, Inc. FIG. 4 depicts an example hierarchical budgeting and planning model 38 for Pizza Palace, Inc., as developed by analysts 6. Model 38 is horizontally organized around the various geographic regions occupied by the franchise, regions 1 through 5, and vertically organized into three reconciliation levels. Corporate goals and targets are set by the analysts 6 and are distributed down through the various "nodes" of the hierarchy. The individual stores of the franchise, referred to as outlets, occupy the bottom level, Level I. Spending forecast data is received at the lowest level and reconciled with these targets at each level.

Each node has a corresponding contributor that is responsible for entering forecast data or reviewing the forecast data in view of the corporate targets. FIG. 4 illustrates three of the contributors: Guy, Peter and Andy. Guy is the Chief Financial Officer for Pizza Palace, Inc. and is responsible for the overseeing all regions. Guy, therefore, is listed as an "owner" of root node 29 and as a "reviewer" for all regions. Peter is a middle level manager charged with overseeing Region 1. As such, Peter is listed as the owner of Region 1 and reviewer for Outlet A. Andy, a manager of a local pizza store, is listed as the owner for Outlet A.

Each node of model 38 is associated with one or more corresponding templates within database 24, depending upon the node's level within the hierarchy. For example, each outlet within Level I is associated with a single template for capturing forecast information. At Level II, each region is associated with the templates of its corresponding child nodes, i.e., the outlets within the region. Root node 39 of model 38 is, therefore, associated with all of the templates for the company.

Figure 5:
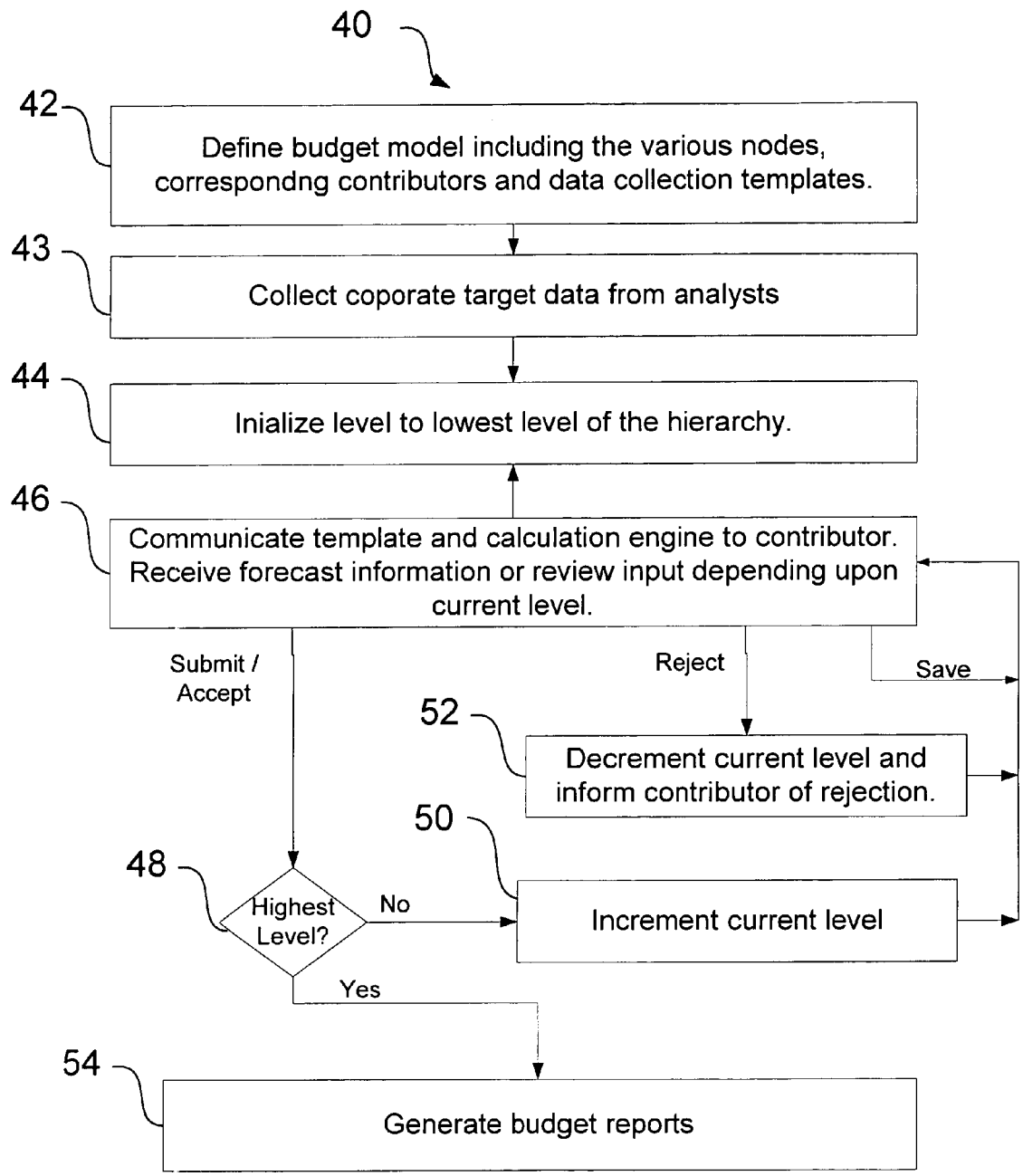
FIG. 5 is a flow chart illustrating an example process for developing and reconciling corporate financial models with detailed budget estimates according to the invention.

FIG. 5 is a flow chart illustrating an example process 40 by which the franchise develops and reconciles corporate financial target and with detailed forecasts. Initially, the financial analyst 6 interacts with budgeting system 8 to develop model 38 of FIG. 4, including the various nodes within the budgeting hierarchy, the contributor at each node and the actual budgeting template applicable to each node (step 42). In addition, budgeting system 8 collects corporate targets from financial analysts 6 (step 43).

At this point, budgeting system 8 starts collecting forecast data from contributors 5 using the defined templates and tracks each template as it progresses through the budgeting processes. More specifically, budgeting system 8 first initializes model database such that the templates start at the lowest level, i.e., Level I (step 44). The contributors associated with the nodes of Level I are instructed, possible by email, that their budgets are due and that they should access budgeting system 8 and provide forecast information.

In response, contributors 5 use computing devices 4 to access budgeting system 8 and either provide spending forecast data or review input, depending upon their level within the hierarchy (step 46). For example, contributors 5 associated with nodes of Level I, such as Andy for Outlet A, interact with the template and enter detailed spending forecast data. Higher-level contributors, such as Peter and Guy, can either accept the forecast data, and thereby pass the information up the review hierarchy, or reject the information and send it down for modification.

If the contributor 5 rejects the forecast data in view of the target data provided by the financial analysts 6, budgeting system 8 passes the budget template back down the hierarchy by decrementing the current level and informs the lower level contributor as to the rejection (step 52). The owner is reminded to re-access budget-planning system 8 and to change the budget as necessary (step 46).

When the contributor 5 accepts the forecast data, budgeting system 8 determines whether the template has reached the highest level of the model (step 48). If the highest level has not been reached, budgeting system 8 increments the current level and passes the template up the hierarchy (step 50). Next, budgeting system 8 invites the reviewer of the budget, i.e., the owner of the parent node, to access budgeting system 8 and review the budget forecast data in view of the corporate targets (step 46).

Once the highest level is reached (Level III), and the owner (Guy) approves all of the spending forecast data in view of the corporate target data, budgeting system 8 generates budget reports 10 for the various nodes of the hierarchy, including budgets for individual stores and collective budgets for the various regions (step 54).

Figure 6:
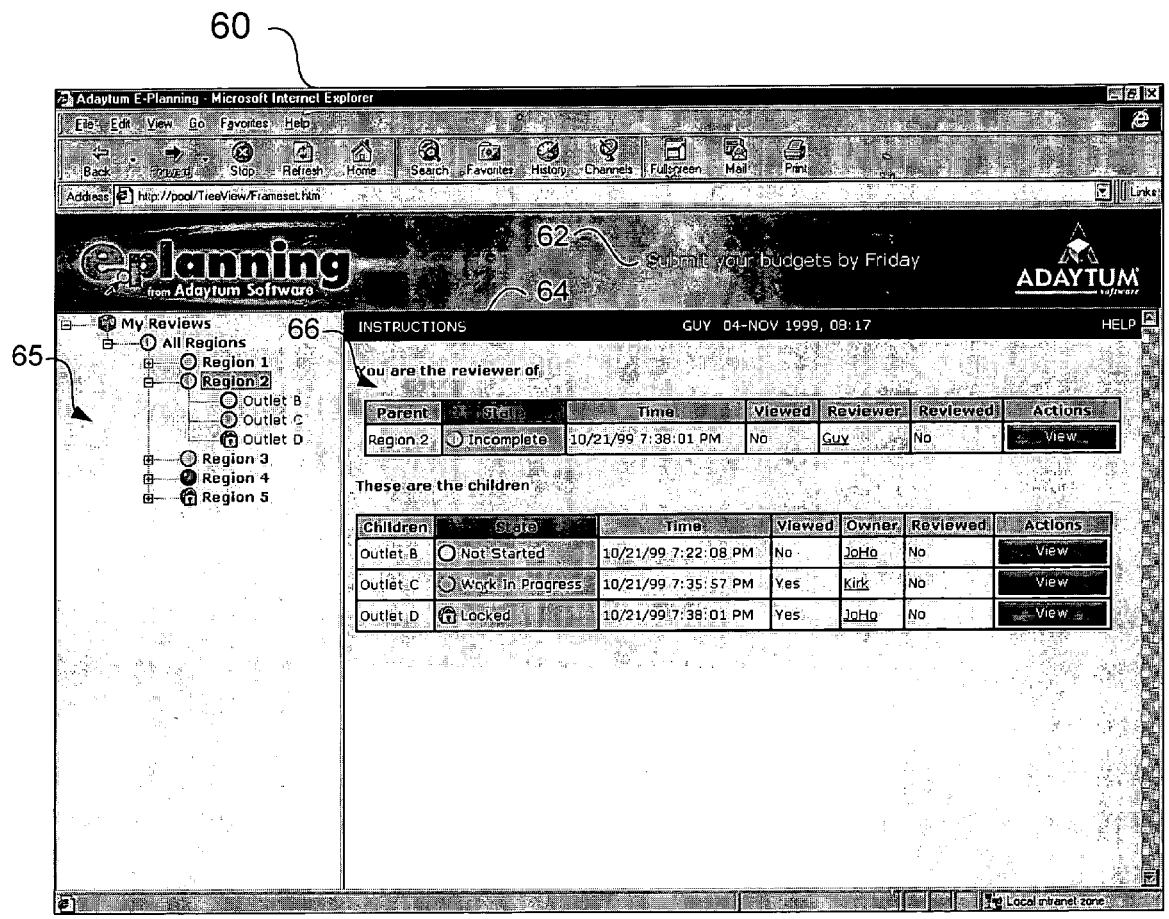
FIGS. 6 through 16 illustrate a number of views of the budgeting process described above.

FIGS. 6 through 14 illustrate a number of views of web browser 30 during the budgeting process described above. For example, FIG. 6 illustrates one embodiment of a window 60 displayed by web browser 30 when Guy, the CFO, accesses budgeting system 8 in order to check on the progress of the various budgets for the pizza franchise. In this example, Guy has accessed budgeting system 8 using Internet Explorer from Microsoft Corporation running Shock Wave™ from Macromedia™ Inc. Window 60 displays: 1) a customizable headline 62 to all contributors and reviewers of a give budget template, 2) a link 64 for displaying instructions, 3) the contributor's name, and 4) the current date. Budgeting system 8 uses the authentication built into the operating system of computing device 4 for security such that new passwords do not have to be created and managed separately.

Window 60 includes a left frame 65 that displays the hierarchal model 38 defined by analysts 6 for the pizza chain. The hierarchy, as described above, includes five sales regions, with Region 2 having 3 pizza stores (Outlet B–Outlet D). The hierarchy represents the workflow of the corporation and, therefore, is intuitive to the contributors. Furthermore, each contributor has a limited view such that left frame 65 only displays the part of the hierarchal model 38 that relates to the particular contributor. Because Guy is a high-level executive defined as a reviewer for all five regions, he can view the entire hierarchy.

Right-hand frame 66 and left-hand frame 65 cooperate such that when a user selects a node in the hierarchy within left-hand frame 65, right-hand frame displays the details of the selected node and its children. More specifically, right-hand frame 66 displays tables detailing the selected node and each of its children. Each table shows: a) a node name, b) an operating state for the node, c) a time of last modification to the template, d) whether the budget template has been opened by the node's owner, e) a name of the owner/reviewer, f) whether the budget template has been reviewed, and g) actions that the user may take on the node.

At the bottom level in the hierarchy, each node has three workflow states: a) NS—the budget has not been started, b) WIP—the budget is a "work in progress" such that the owner has input some data but has not finished, and c) LOCKED—the owner has submitted the budget for review. Once the budget is submitted, the owner cannot make changes unless the next level reviewer rejects the submission, which changes the state of the lower line node back to WIP.

Figure 7:
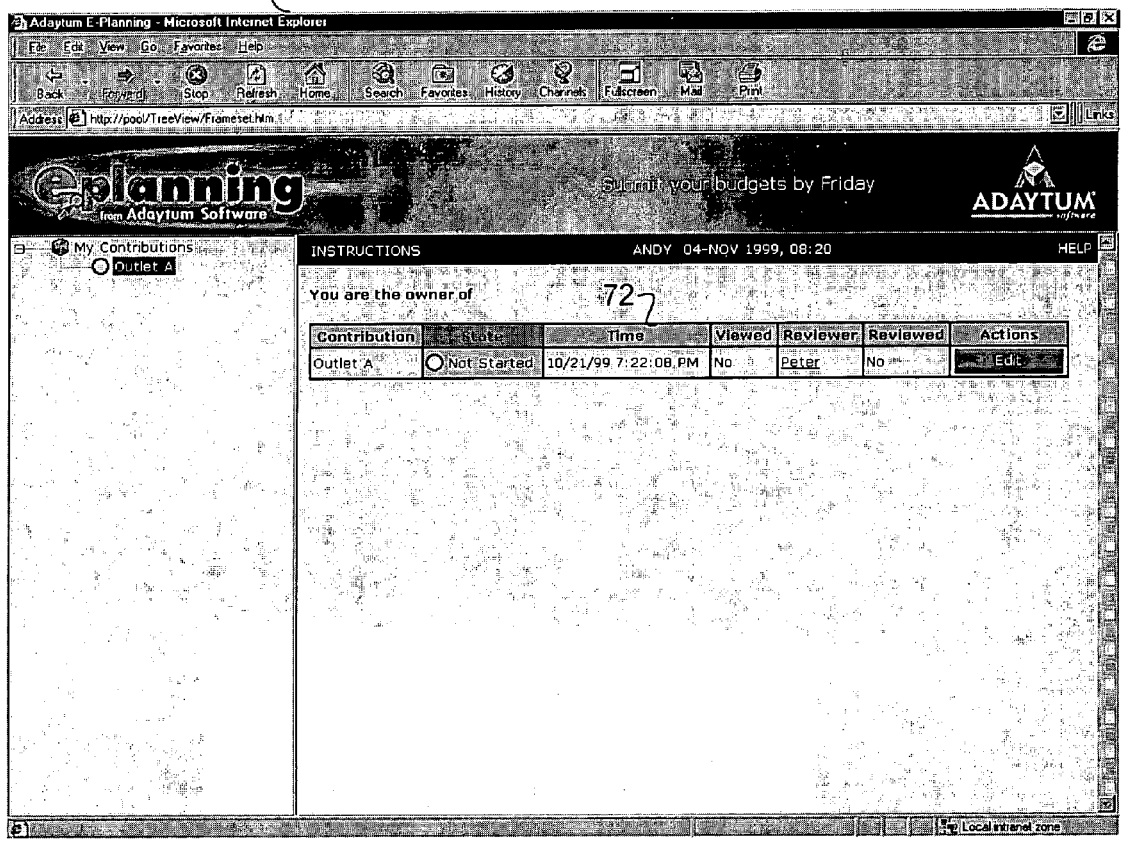

The view for Andy, a manager for a local pizza store, is quite different than from Guy. FIG. 7 illustrates an example window 70 displayed by web browser 30 when Andy accesses budgeting system 8. As illustrated by FIG. 7, Andy can only view Outlet A, i.e., the outlet for which he is responsible. Because Andy has not started the budgeting process, table 72 of right-hand frame 74 displays the NS state for the node.

Figure 8:
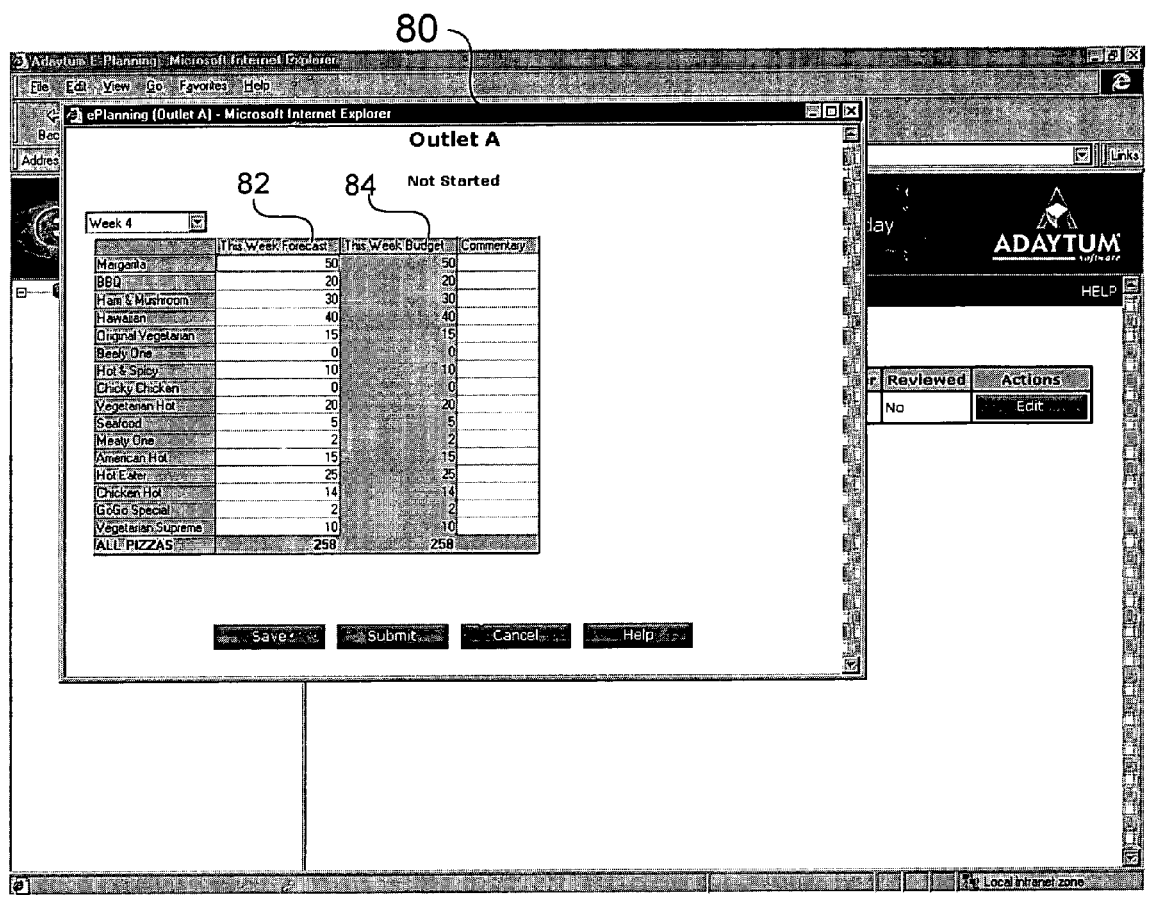

FIG. 8 illustrates a window 80 displayed when Andy clicks on Outlet A and initiates the budgeting process. At this point, web browser 30 downloads template 34 and data cube 36. This is one of the few times when there is traffic across network 18. As the calculation engine 32 resides on the client, no web traffic takes place as the user enters budgeting information. Andy interacts with window 80 to input spending forecast data 82, but cannot update target data 84 that has been set by the analysts and cannot overwrite formulas embedded within the template. In this manner, window 80 allows Andy to view the financial targets set by the analysts while entering the detailed forecasting information. The calculation engine 32 allows window 80 to operate as an intelligent spreadsheet that supports, arithmetic operations, conditional logic, weighted and time averages and a number of other operations. In addition, the analysts can configure window 80 to provide context sensitive help for the row, column and page items. Upon entering spending forecast data 82, Andy can save the information and continue the process later or can submit the forecast information to Peter for review.

Figure 9:
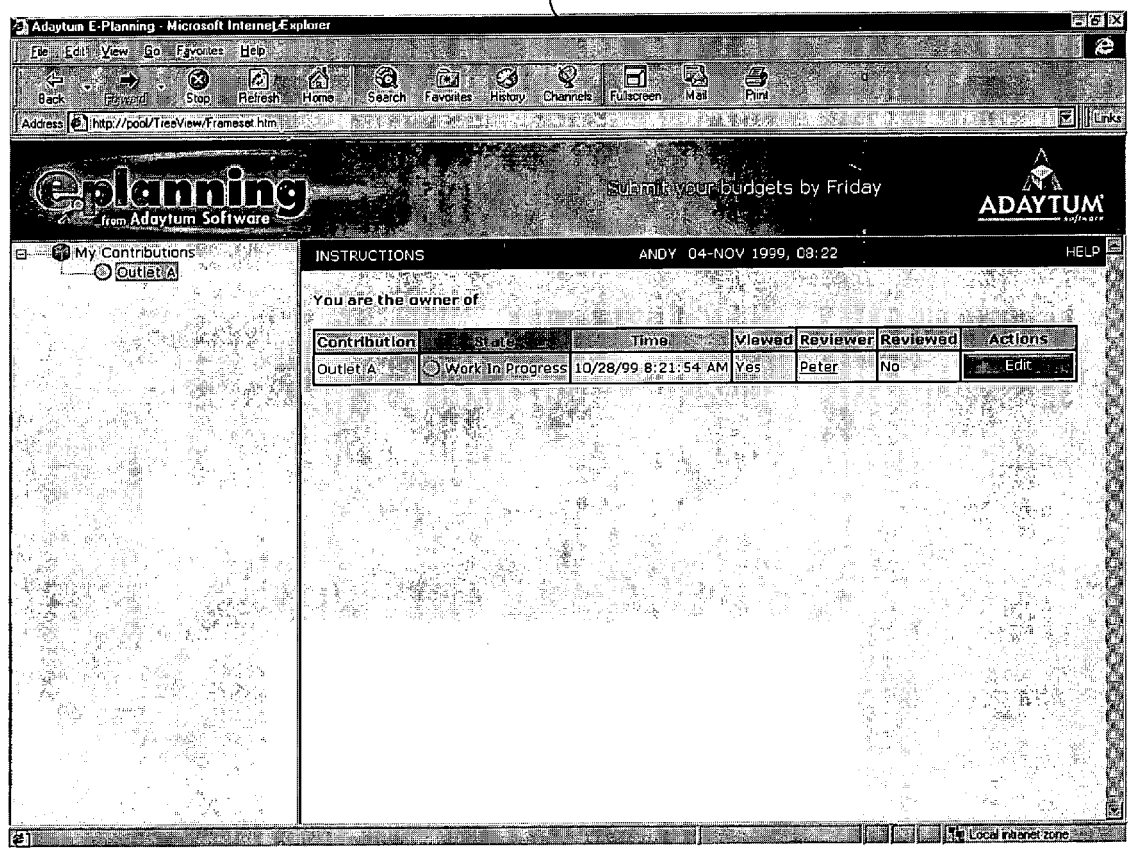
Figure 10:
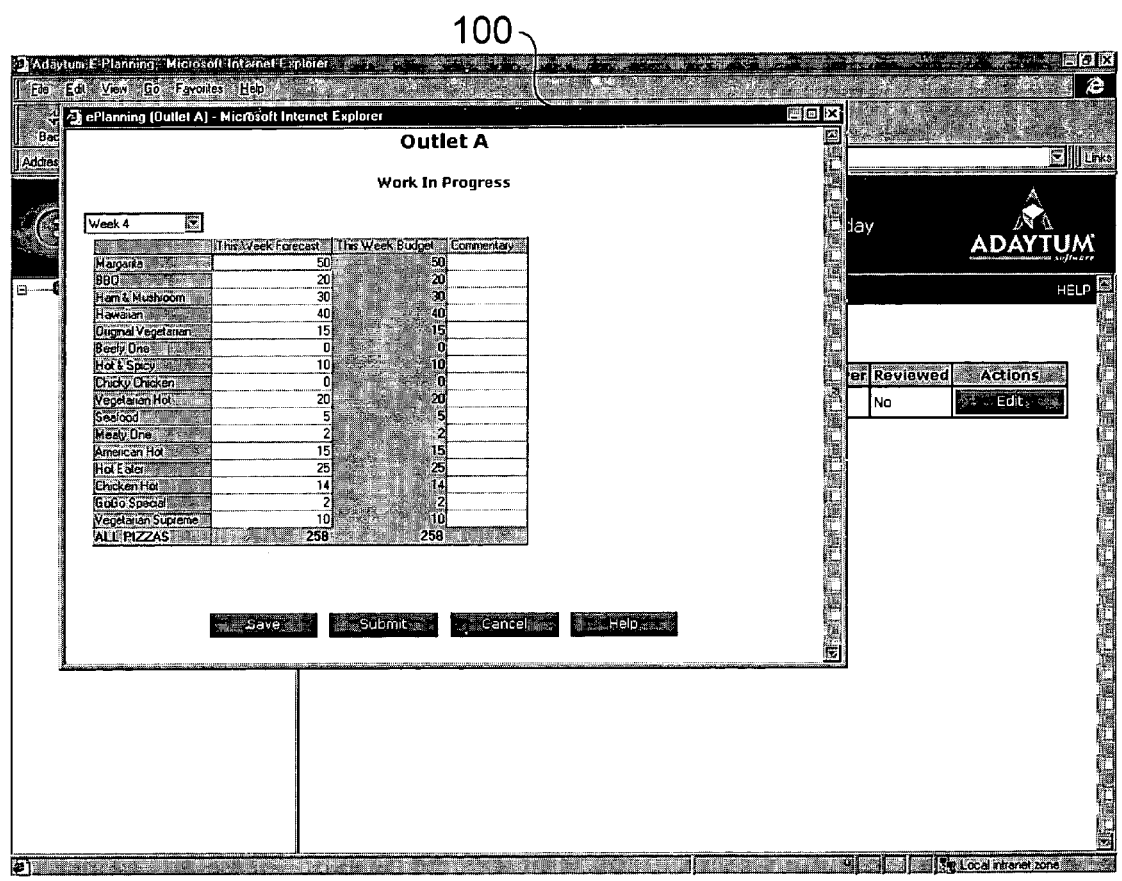
Figure 11:
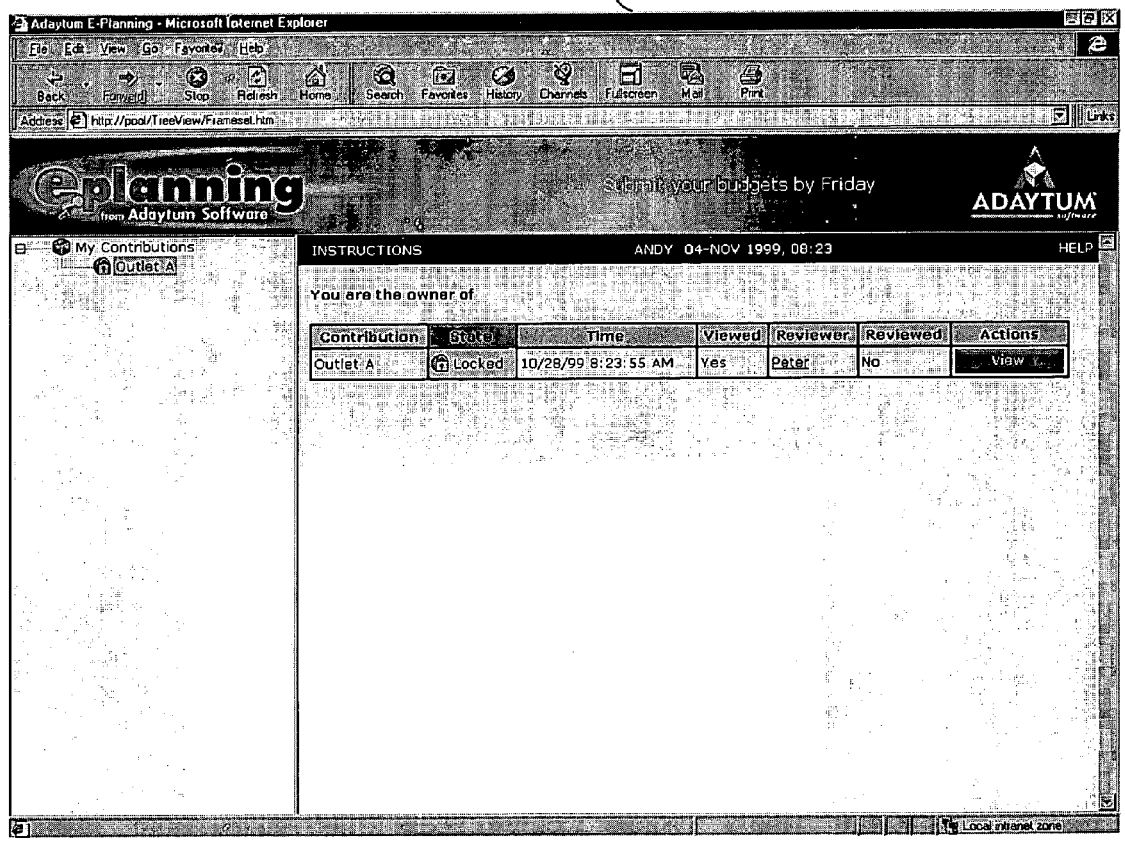

When Andy saves the template, as illustrated in FIG. 9, web browser 30 displays window 90, which reflect the state of the node as a "work in progress" (WIP). In this state, Andy can return and continue to edit the forecast data and submit the forecast data for review by Peter, as illustrated by window 100 of FIG. 10. Once the forecast data is submitted, the state of the node is changed to LOCKED, as indicated by window 110 of FIG. 11. In this state, Andy cannot modify the forecast information unless Peter reviews the template and rejects the information.

Figure 12:
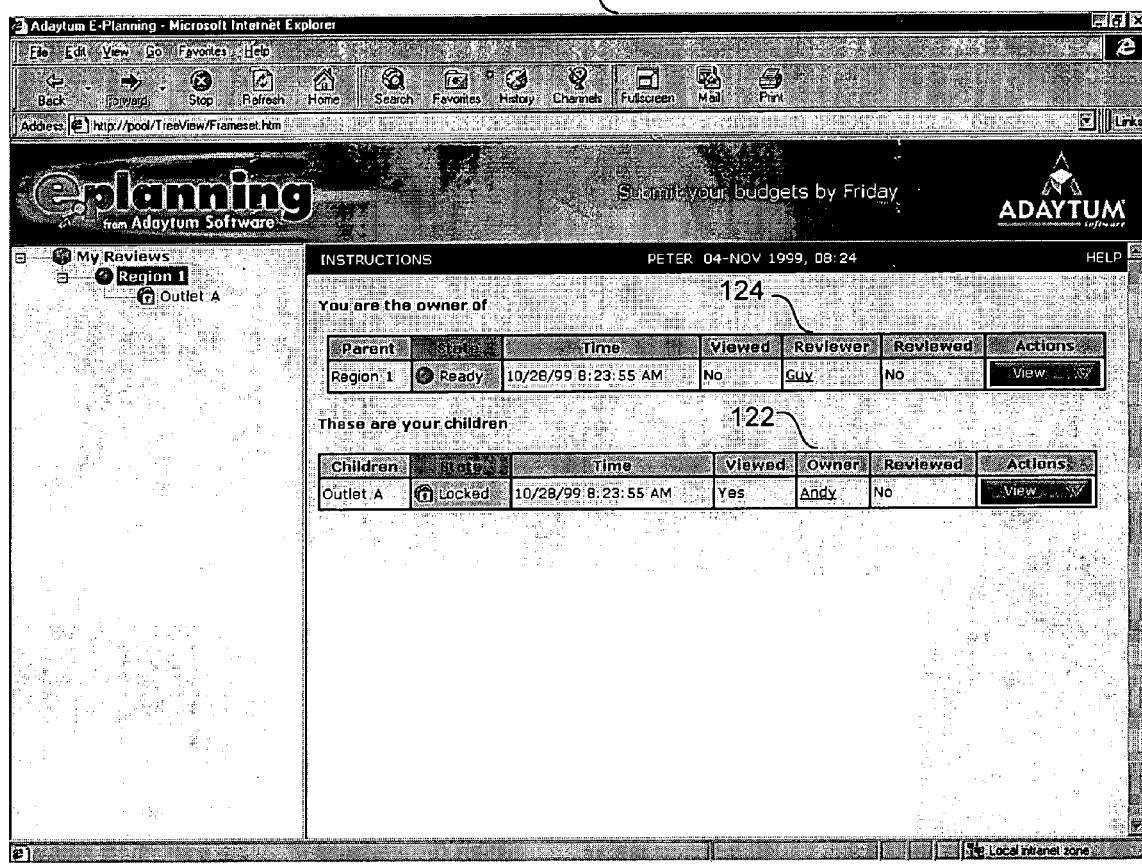

FIG. 12 illustrates an example window 120 displayed by web browser 30 when Peter accesses budgeting system 8 in order to review the budget information for which he is responsible. As illustrated by FIG. 12, Peter is defined as the owner for Region 1 and the reviewer for Outlet A. Upon logging in, Peter is immediately able to tell that Andy has submitted the budget information, which is reflected by the LOCKED state displayed by table 122 of the right-hand window. In addition, because all of the child nodes to Region 1, i.e. Outlet A, have submitted forecast information, table 124 displays the state of Region 1 as READY, indicating Peter can review all of the budget information.

Figure 13:
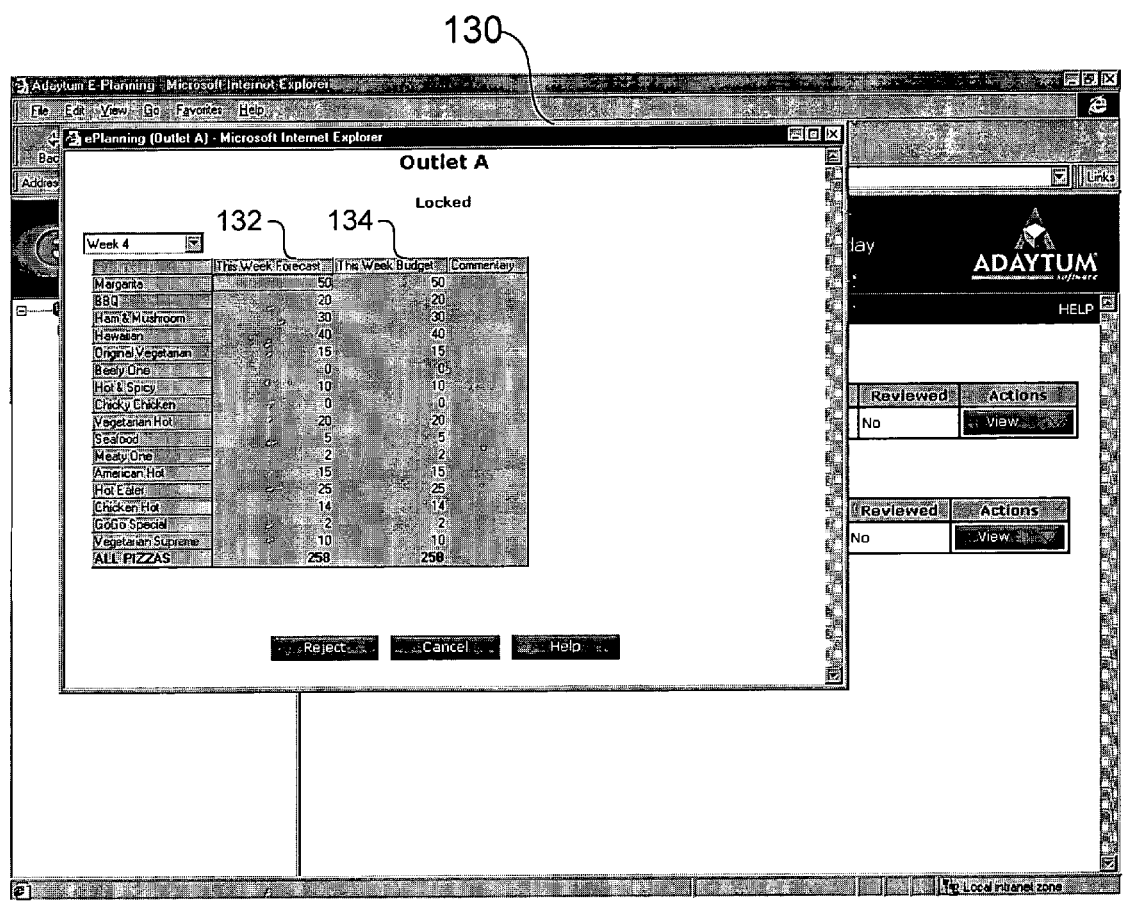

FIG. 13 illustrates an example window 130 displaying the template when selected by Peter for review. Notably, all information, including the forecast data 132 set by the owner (Andy) and the target data 134 set by the financial analysts, is read-only and cannot be modified. As such, Andy has two options as a reviewer: (1) reject the forecast information and send the grid back to Peter for modification, or (2) approve the forecast information such that the template can be reviewed by Guy, the designated reviewer for Region 1. At this level, the node has five possible states. The first three are similar to the Level I nodes: NS (not started), WIP (work in progress) and LOCKED. In addition, higher-level nodes can also be INCOMPLETE and READY. The INCOMPLETE state occurs when at least one child node is in the NS state, i.e., when a person reporting to the reviewer has not started the budgeting process. Thus, reviewers can quickly tell if the template has not been viewed and that the owner needs some added prompting. The READY state occurs when all child nodes have completed the budgeting process. At this point, the reviewer is the critical path of the budgeting process and must either reject or submit the data from the subordinates. One advantage of this approach over other methods of data collection is that the middle level managers have a simple efficient method of showing upper level management that they have approved of, and are committed to, the budgeting forecasts.

Figure 14:
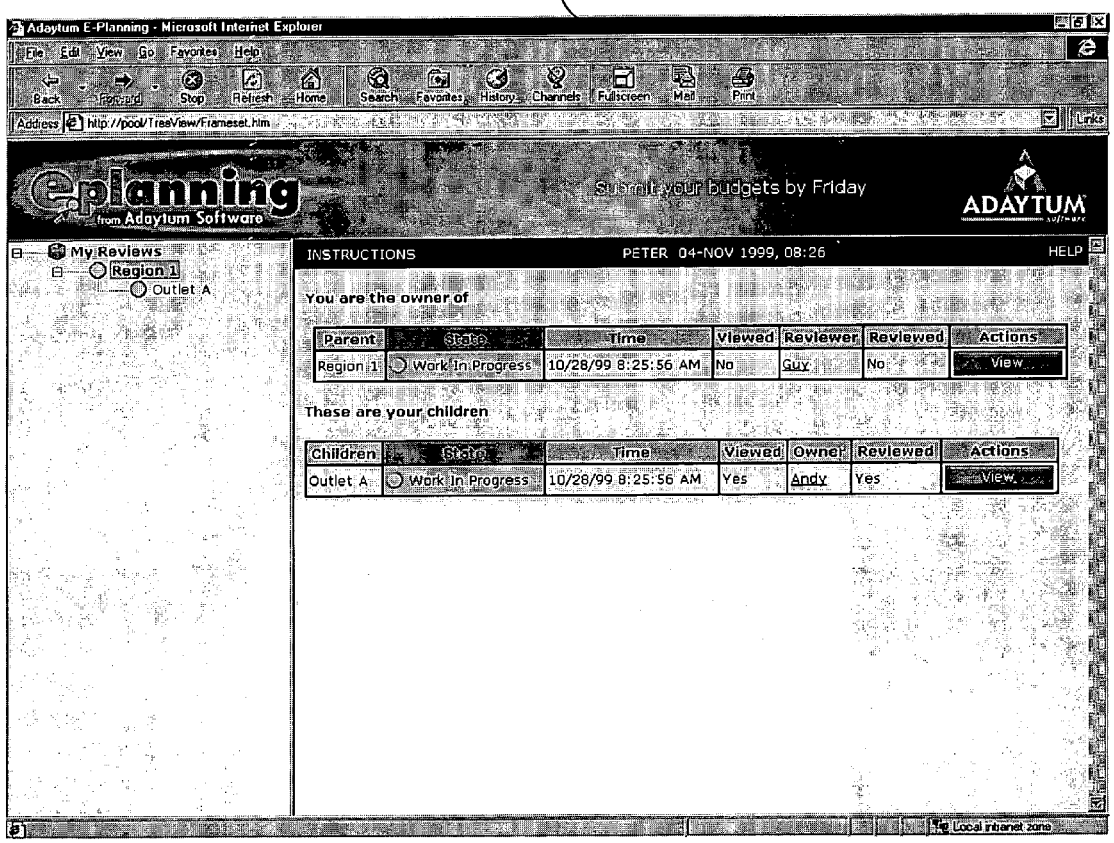

FIG. 14 illustrates an example view of the information when Peter rejects the information from Outlet A. Outlet A has transitioned back to the WIP state, which therefore also moves Region 1 to the WIP state. Andy, the owner, automatically receives an e-mail from Peter, his reviewer, telling him why the submission was rejected. This reconciliation process continues until acceptable budget information is ultimately propagated upward through all of the levels of the hierarchy.

Figure 15:
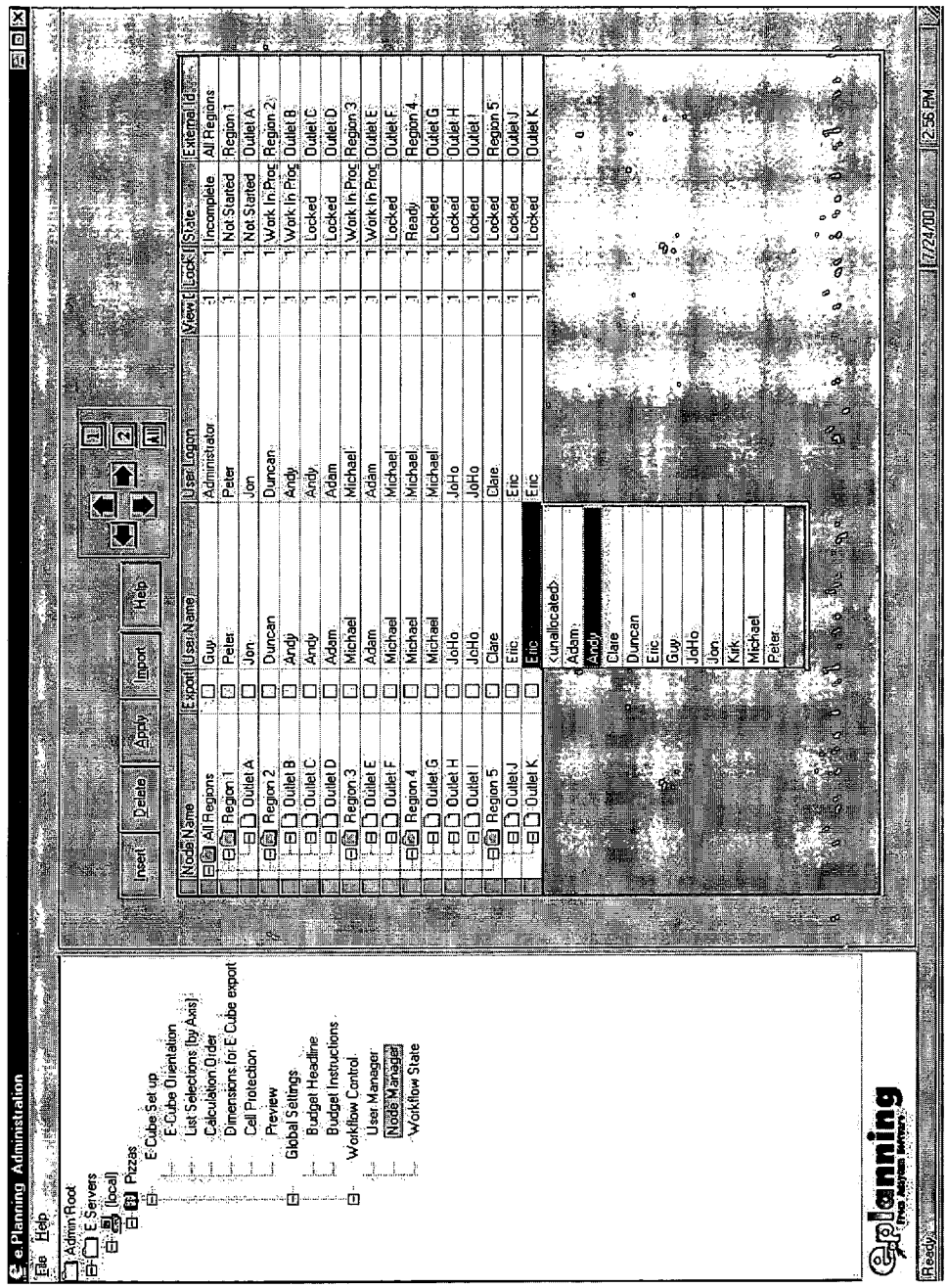
Figure 16:
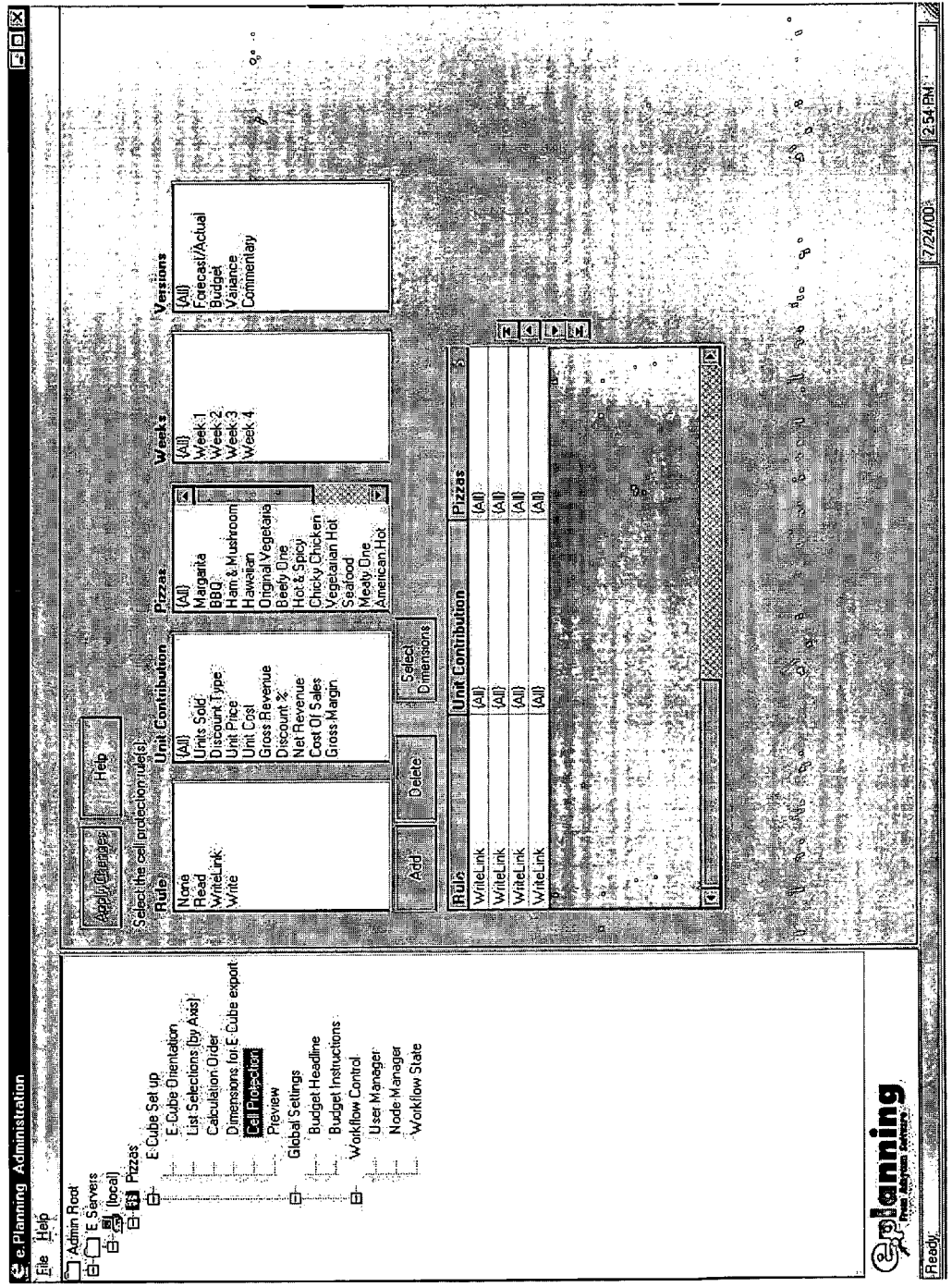

FIG. 15 illustrates an example view presented by browser 30 when a financial analyst 6 creates and maintains model 38, including assigning owners to the various nodes of the hierarchy. FIG. 16 illustrates an example view presented by browser 30 when the financial advisor defines an access level (e.g. read vs. write) for each node.

Figure 17:
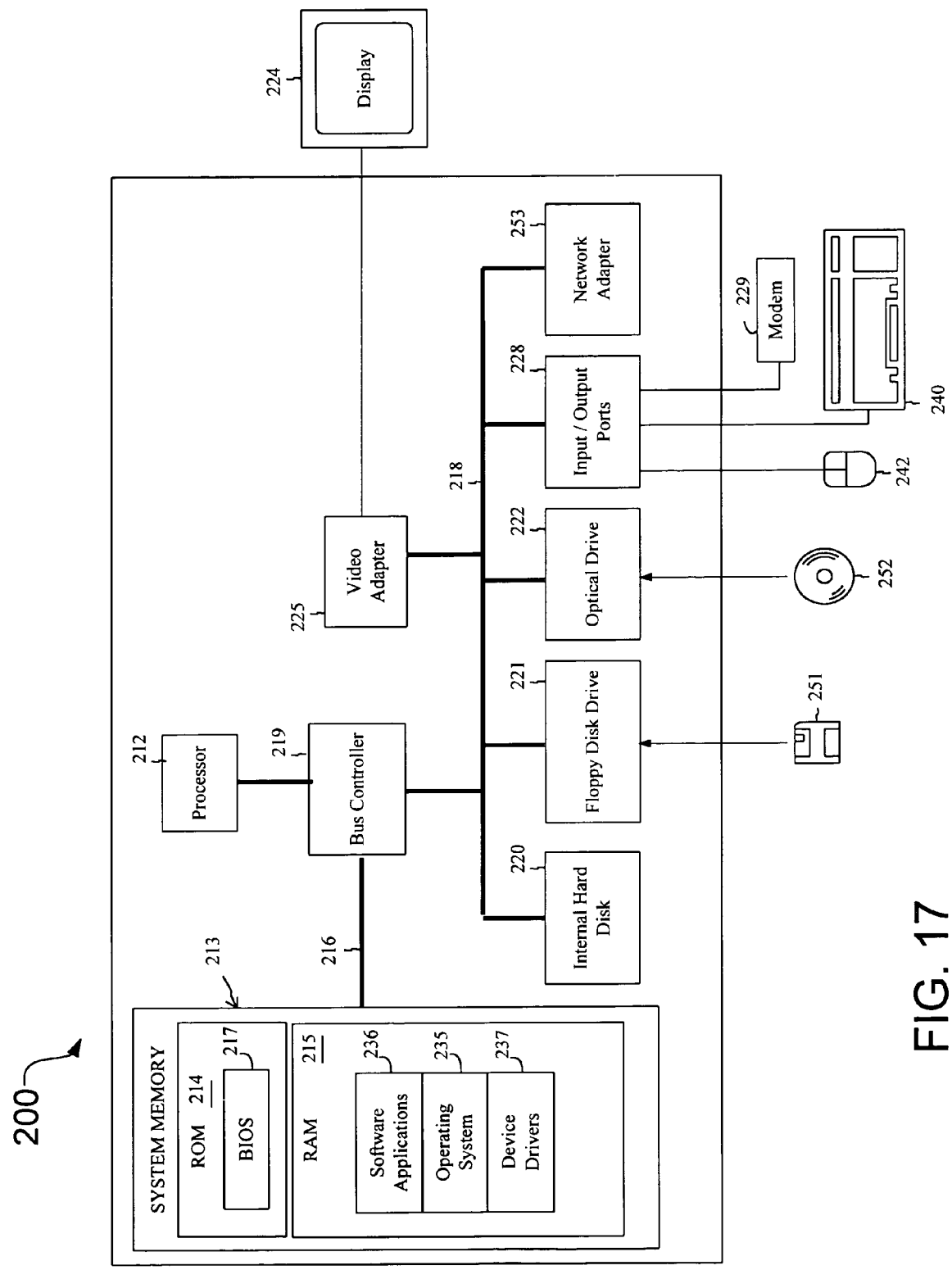
FIG. 17 is a block diagram illustrating a computer suitable for implementing the various embodiments of the invention.

FIG. 17 illustrates a programmable computing system (system) 200 that provides an operating environment suitable for implementing the techniques described above. The system 200 includes a processor 212 that in one embodiment belongs to the PENTIUM® family of microprocessors manufactured by the Intel Corporation of Santa Clara, Calif. Other example microprocessors include the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. In various configurations, system 200 represents any server, personal computer, laptop or even a battery-powered, pocket-sized, mobile computer known as a hand-held PC or personal digital assistant (PDA).

System 200 includes system memory 213, including read only memory (ROM) 214 and random access memory (RAM) 215, which is connected to the processor 212 by a system data/address bus 216. ROM 214 represents any device that is primarily read-only including electrically erasable programmable read-only memory (EEPROM), flash memory, etc. RAM 215 represents any random access memory such as Synchronous Dynamic Random Access Memory.

Within the system 200, input/output bus 218 is connected to the data/address bus 216 via bus controller 219. In one embodiment, input/output bus 218 is implemented as a standard Peripheral Component Interconnect (PCI) bus. The bus controller 219 examines all signals from the processor 212 to route the signals to the appropriate bus. Signals between the processor 212 and the system memory 213 are merely passed through the bus controller 219. However, signals from the processor 212 intended for devices other than system memory 213 are routed onto the input/output bus 218.

Various devices are connected to the input/output bus 218 including hard disk drive 220, floppy drive 221 that is used to read floppy disk 251, and optical drive 222, such as a CD-ROM drive that is used to read an optical disk 252. The video display 224 or other kind of display device is connected to the input/output bus 218 via a video adapter 225.

Users enter commands and information into the system 200 by using a keyboard 240 and/or pointing device, such as a mouse 242, which are connected to bus 218 via input/output ports 228. Other types of pointing devices (not shown) include track pads, track balls, joysticks, data gloves, head trackers, and other devices suitable for positioning a cursor on the video display 224.

System 200 also includes a modem 229. Although illustrated as external to the system 200, those of ordinary skill in the art will quickly recognize that the modem 229 may also be internal to the system 200. The modem 229 is typically used to communicate over wide area networks (not shown), such as the global Internet. Modem 229 may be connected to a network using either a wired or wireless connection.

Software applications 236 and data are typically stored via one of the memory storage devices, which may include the hard disk 220, floppy disk 251, CD-ROM 252 and are copied to RAM 215 for execution. In one embodiment, however, software applications 236 are stored in ROM 214 and are copied to RAM 215 for execution or are executed directly from ROM 214.

In general, the operating system 235 executes software applications 236 and carries out instructions issued by the user. For example, when the user wants to load a software application 236, the operating system 235 interprets the instruction and causes the processor 212 to load software application 236 into RAM 215 from either the hard disk 220 or the optical disk 252. Once one of the software applications 236 is loaded into the RAM 215, it can be used by the processor 212. In case of large software applications 236, processor 212 loads various portions of program modules into RAM 215 as needed.

The Basic Input/Output System (BIOS) 217 for the system 200 is a set of basic executable routines that have conventionally helped to transfer information between the computing resources within the system 200. Operating system 235 or other software applications 236 use these low-level service routines. In one embodiment system 200 includes a registry (not shown) that is a system database that holds configuration information for system 200. For example, the Windows® operating system by Microsoft Corporation of Redmond, Wash., maintains the registry in two hidden files, called USER.DAT and SYSTEM.DAT, located on a permanent storage device such as an internal disk.

The invention has been described in terms of particular embodiments. Other embodiments are within the scope of the following claims. For example, the steps of the invention can be performed in a different order and still achieve desirable results. This application is intended to cover any adaptation or variation of the present invention. It is intended that this invention be limited only by the claims and equivalents thereof.

What is claimed is:

1. A computer-based method comprising:
   capturing with a server forecast data from a set of contributors according to a multi-level organizational model;
   capturing with the server target data from a set of analysts;
   executing software on the server to perform a reconciliation process to reconcile the target data and the forecast data in accordance with the organizational model by:
      selecting one or more of the contributors associated with a current level of the organizational model,
      presenting the target data and the forecast data to the selected contributors,
      receiving with the server review information from the selected contributors, wherein the review information indicates whether the selected contributors accept or reject the forecast data in view of the captured target data,
      automatically updating the current level with the server based upon the review information,
      receiving with the server updated forecast data based on the updated current level when at least one of the selected contributors rejects the forecast data, and
      repeating the reconciliation process with the server until the current level reaches a predefined level of the model and the review information indicates that the selected contributors associated with that predefined level accept the forecast data; and
   generating a budget report based on the forecast data.

2. The method of claim 1, wherein capturing forecast data comprises receiving the forecast data from a remote computing device over a packet-based network.

3. The method of claim 2, wherein capturing the forecast data comprises communicating a template and a calculation engine to the remote computing device, wherein the template includes a data cube for storing the target data and the forecast data.

4. The method of claim 3, wherein the template and the calculation engine are Active X components capable of receiving data and locally processing data on the computing device.

5. The method of claim 1, wherein the model includes a plurality of hierarchically arranged nodes, and each node corresponds to one or more of the contributors.

6. The method of claim 1, wherein generating a budget report comprises generating a budget report based on the forecast data when the current level reaches a highest level of the model.

7. The method of claim 1, wherein updating the current level comprises:
   incrementing the current level when all of the selected contributors accept the forecast data; and
   decrementing the current level when at least one of the selected contributors rejects the forecast data.

8. A budgeting system for an organization comprising:
   a database configured to store data defining a set of contributors, a set of analysts, and a multi-level model of an organization, wherein the model has a plurality of hierarchically arranged nodes, each node corresponding to at least one of the contributors; and
   a server coupled to the database,
   wherein the server accesses the data within the database, and is configured to capture forecast data from the contributors and target data from the analysts,
   wherein the server selectively presents the forecast data and the target data to a subset of the contributors associated with a current level of the model, and increments the current level when all of the contributors associated with nodes of the current level accept the forecast data and decrements the current level when at least one of the contributors associated with the nodes of the current level rejects the forecast data, and wherein the server generates a budget report based on the forecast data when the current level reaches pre-defined level within the model.

9. The system of claim 8 further comprising:
a computing device communicatively coupled to the server via a packet-based network; and
a calculation engine executing in an operating environment provided by the computing device, wherein the calculation engine manipulates a data cube in response to the target data and the forecast data.

10. The system of claim 9, wherein the template and the calculation engine are Active X components capable of receiving data and locally processing data on the computing device.

11. The system of claim 8, wherein the server:
receives review information from the selected contributors for the current level, wherein the review information indicates whether the selected contributors accept or reject the forecast data in view of the target data;
automatically selectively increments or decrements the current level of the organizational hierarchy based upon the review information; and
upon decrementing the current level to a lower level, presents an interface to receive revised forecast data from at least one contributor associated with the lower level.

12. A computer-based method for generating a budget by executing software on a computer, the method comprising:
storing a model of an organization, wherein the model has a plurality of nodes hierarchically arranged into a number of levels;
associating a contributor with each node of the model;
capturing with a computer forecast data from a contributor associated with a node within a lower level of the model;
capturing with the computer target data from a set of analysts;
selectively presenting with the computer the forecast data and the target data to a subset of the contributors for reconciliation based on a current level of the model;
receiving review information with the computer from the subset of the contributors selected based on the current level;
updating the current level with the computer according to review information; and
generating with the computer a budget for the organization based on the forecast data when the forecast data is approved by a contributor associated with a root node within a highest level of the model.

13. The method of claim 12, wherein updating the current level includes incrementing the current level when the review information indicates an acceptance of the forecast data and decrementing the current level when the review information indicates a rejection of the forecast data.

14. The method of claim 12, wherein capturing forecast data comprises receiving the forecast data from a remote computing device over a packet-based network.

15. The method of claim 14, wherein capturing the forecast data comprises communicating a template and a calculation engine to the computing device, wherein the template includes a data cube for storing the target data and the forecast data.

16. A system comprising:
means for storing a definition of a hierarchical model of an organization;
means for receiving organizational target data and forecast data according to the model, wherein the receiving means includes means for capturing the forecast data from a set of contributors and the organizational target data from a set of analysts;
means for reconciling the organization target data and forecast data according to the model, wherein the reconciling means selectively presents the forecast data and the target data to a subset of the contributors associated with a current level of the model, and increments the current level when all of the contributors associated with the current level accept the forecast data and decrements the current level when at least one of the contributors associated with the current level rejects the forecast data; and
means for generating an electronic budget based on the reconciled target data and forecast data.

17. The system of claim 16, wherein the reconciling means includes:
means for receiving review input that indicates whether the contributors associated with the current level reject or accept the forecast data; and
means for propagating the forecast data up and down the organization in accordance with the hierarchical model based on the review input.

* * * * *

UNITED STATES PATENT AND TRADEMARK OFFICE
CERTIFICATE OF CORRECTION

| | | |
|---|---|---|
| PATENT NO. | : 7,130,822 B1 | Page 1 of 1 |
| APPLICATION NO. | : 09/628479 | |
| DATED | : October 31, 2006 | |
| INVENTOR(S) | : Their et al. | |

It is certified that error appears in the above-identified patent and that said Letters Patent is hereby corrected as shown below:

TITLE PAGE, ITEM (56)

On page 2, column 1 (FOREIGN PATENT DOCUMENTS), "WO  WO 02/192241 A1  3/2002" should read --WO  WO 02/19224 A1  03/2002--

TITLE PAGE, ITEM (56)

On page 2, column 1 (FOREIGN PATENT DOCUMENTS), pleae insert --WO  WO 96/30852 A1  10/1996--

Signed and Sealed this

Seventeenth Day of April, 2007

JON W. DUDAS
*Director of the United States Patent and Trademark Office*